Jan. 19, 1965     J. W. MEIER     3,166,435
DRYING PROCESS FOR HYDROPHILIC FILMS
Filed Nov. 28, 1961
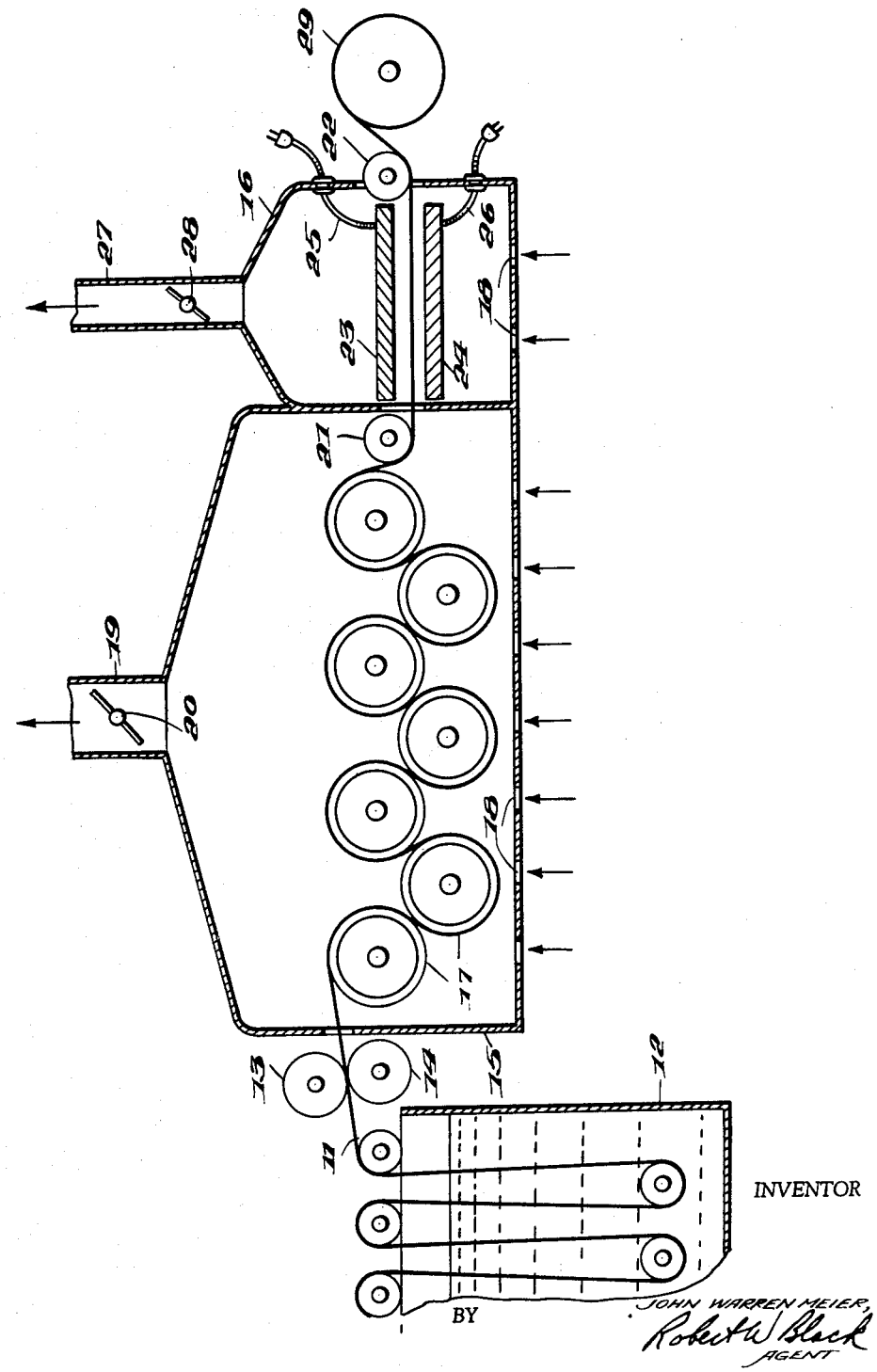
INVENTOR
JOHN WARREN MEIER,
BY Robert W Black
AGENT

3,166,435
DRYING PROCESS FOR HYDROPHILIC FILMS
John W. Meier, Hendersonville, Tenn., assignor to E. I. du Pont de Nemours and Company, Wilmington, Del., a corporation of Delaware
Filed Nov. 28, 1961, Ser. No. 155,332
7 Claims. (Cl. 117—119.6)

This invention relates to the manufacture of non-fibrous, hydrophilic films and more particularly to an improved drying process in the preparation of a polymer coated regenerated cellulose film.

The process of this invention is generally applicable in the production of polymer coated film from any hydrophilic base film which requires drying prior to the coating step. However, because of the commercial importance of regenerated cellulose film derived from viscose, such film constitutes the preferred hydrophilic base material for treatment in accordance with the principles of the present invention and the invention will be described hereinafter with specific reference to the preparation of coated film with improved appearance from gel regenerated cellulose base film.

The most commonly used commercial scale method for manufacturing regenerated cellulose film is the viscose process which is described in United States Patents 1,548,864 and 1,601,289 to Brandenberger. In this process, an alkaline, aqueous solution of sodium cellulose xanthate (viscose) is forced through an elongated orifice in the form of a sheet into a coagulating bath to form a coherent web, which freshly coagulated film is then promptly regenerated, washed, desulfured, bleached softened and dried. The dried film is wound into rolls (sometimes called "cast mill rolls") for convenience in handling, storing, and processing. Up through the softening stage, the regenerated cellulose web remains in a gel condition, i.e., completely saturated with aqueous solution. Since the gel regenerated cellulose film contains about 3.0 to 3.5 times the weight of the dry cellulose as water, a substantial amount of moisture must be removed in the drying operation. In losing this moisture the film shrinks in length, width and thickness, thus reducing the area of the film obtained and becomes puckered and wrinkled. To prevent excessive loss of area, the formation of surface irregularities such as puckers, wrinkles and the like, and impairment of transparency, it is customary to dry the web by passing it in a sinuous path about a series of heated rolls, such as are described in United States Patents 2,000,179 (Herndon), 2,141,277 (Chylinski), etc., which are operated at speeds which maintain in the film both longitudinal and transverse tension sufficient to lessen or prevent the aforementioned decrease in area and surface deformation. By employing the specific drying conditions disclosed in United States Patent 2,746,166 to Stevens, softened regenerated cellulose film having a high degree of flatness is obtained. The present invention provides a still further improvement in film drying technology as will be seen hereinafter.

Since softened regenerated cellulose film, per se, is not satisfactory for many packaging applications, it is usually coated with some transparent, organic, polymeric coating which imparts such desirable properties as moisture-proofness and heat-sealability or to improve the durability, dimension stability or surface properties. In general, it is desirable that the coating applied to softened regenerated cellulose film be uniformly distributed, smooth and have good appearance. This is particularly true if the coated film is to be used to wrap material such as foods and other consumer goods, since non-uniformity and defects in the coating or base film adversely affect the optical properties of the film, hence, detract considerably from the "eye appeal" of goods wrapped in the film.

Organic polymeric coatings are usually applied to regenerated cellulose film at high speed by passing a continuous web of the film into a solution or dispersion containing the coating material, then through a metering device, such as doctor rolls, which regulates the liquid coating left on the web. The coating is then rapidly smoothed while it is still in the fluid state by contacting the film with one or more smoothing rolls, and then the web is finally dried to remove the coating solvent or dispersing liquid.

The most commonly used coating compositions for regenerated cellulose films are: volatile organic solvent solutions of nitro-cellulose in combination with various plasticizers, resins and waxes; volatile organic solvent solutions of vinylidene chloride copolymers; and aqueous dispersions of vinylidene chloride copolymers. The types of volatile solvents most frequently used, either alone or in combination, are ketones, ester, ethers, and aromatic, aliphatic and halogenated hydrocarbons; for example; acetone, methyl ethyl ketone, ethyl acetate, tetrahydrofurane, toluene, n-octane, and carbon tetrachloride. Considerable care is taken in compounding a coating bath to choose a solvent or solvent mixture which permits uniform coalescence of the polymeric coating into a smooth transparent layer free of physical or optical defects.

Experience has shown that coatings applied to regenerated cellulose films from aqueous copolymer dispersions as well as those applied from solution in volatile organic solvents (such as acetone) which swell the base film frequently have a characteristic mottled, splotchy appearance which may be quite pronounced at the edges of the film, but diminishes in intensity with the distance in toward the center of the film sheet, hence is referred to as "edge blush." Despite this appearance defect, regenerated cellulose films coated with vinylidene chloride copolymers applied from aqueous dispersions have been produced commercially in large quantities within the last few years due to the low cost of the aqueous dispersing medium as compared with the cost of volatile organic solvents. It frequently happens, however, that the intensity of the "edge blush" is so severe that it is necessary to slit off portions of the edge lanes of the coated film and either sell it as second or third quality film or discard it as waste, thus increasing the overall cost of producing the coated film.

In the past, considerable effort has been expended in seeking out the cause of "edge blush" in coated film and to evaluate various means for preventing this film defect. Although the problem evaded solution until the present invention, past research did reveal the following interesting observations: (1) the intensity of "edge blush" varies from time to time on film produced by the same casting machine and coated under identical conditions, (2) microscopic examination of regenerated cellulose base film which yields coated film with severe "edge blush" have failed to reveal any surface defects in the base film which might cause "edge blush," (3) on removing the coating from film having "edge blush," the coating retains the blushed appearance, while the base film has no visible defects. Since these facts all seem to indicate that "edge blush" is caused by some defect in the coating composition or some unknown factor in the coating process, rather than being caused by some imperfection of the base film, most of the past efforts devoted to overcome edge blush were confined to careful examination of the variables in the coating process. In view of the present invention, it is understandable why the past efforts failed to solve the "edge blush" problem.

It is an object of this invention to provide a process for preparing non-fibrous hydrophilic films. It is a further object of this invention to provide an improved drying process in the preparation of a polymer coated regenerated cellulose film. A still further object of this invention is to provide a process for preparing coated films free of "edge blush," wrinkles and folds and having good flatness. These and other objects will appear hereinafter.

These and other objects of this invention are accomplished by the process of this invention which comprises drying a non-fibrous film of gel hydrophilic material to a moisture content within the range of 75 to 15 percent, based on the dry weight of the hydrophilic material, by contacting the film with a heated supporting surface, completing the drying of the film to a moisture content within the range of 1 to 10 percent by passing it through at least one span in which the film is suspended out of contact with a heated surface, coating the dried film with a liquid coating composition containing an organic polymeric material and a liquid medium which swells the hydrophilic film, then subsequently drying the coated film.

As has already been stated, the preferred hydrophilic base film is regenerated cellulose prepared by the viscose process. The preferred coating composition is an aqueous dispersion of copolymer of vinylidene chloride, methyl acrylate and itaconic acid in the ratio of 94/6/1 prepared in accordance with U.S. Patent 2,570,478 to Pitzl. It is further preferred that the copolymer dispersion be modified by the addition of a polyhydric alcohol such as glycerine, ethylene glycol, propylene glycol, butylene glycol, diethylene glycol, triethylene glycol, etc. as taught by U.S. Patent 2,961,340 (Meier) and be applied and smoothed as disclosed in U.S. Patent 2,977,243 (Meier).

The invention will be more clearly understood from the following description and examples which are given with reference to the accompanying drawing, which is a diagrammatic side elevation of a film dryer that is suitable for carrying out the critical drying step of the invention.

Referring to the drawing, wet gel regenerated cellulose film 11 which has been impregnated with a softener and an anchorage resin or agent in tank 12 leaves the softener-resin tank 12 and passes through squeeze rolls 13 and 14 which removes the excess treating liquid. The gel film 11, which now contains about 3.0 to 3.5 times the weight of dry cellulose as water, enters the dryer that is composed of two compartments, 15 and 16. In the first compartment 15, drying is accomplished by passing the film in a sinuous path around a series of dryer rolls 17 which are heated with either hot water or steam. The moisture driven from the film during drying in the first compartment 15 is swept away by a stream of low humidity air which enters the dryer through air vents 18 and is expelled through exhaust stack 19 by a blower not shown. The degree of drying in this compartment is regulated by controlling the supply of steam or hot water passing through the dryer rolls 17 and the amount of air passing through the compartment by adjusting damper 20. While passing through the first compartment 15, the film is dried while being held in close contact with the dryer rolls 17, thus preventing wrinkling, folding, puckering and excessive shrinkage.

As the film 11 leaves the first compartment 15, it passes around guide roll 21 then across to guide roll 22 located on the opposite side of the second dryer compartment 16. In the second compartment 16, the film is dried by infrared heaters 23 and 24 to which electric current is supplied through insulator wires 25 and 26, respectively. The film is supported solely by guide rolls 21 and 22 with just sufficient tension to prevent wrinkling and is out of physical contact with any heated surfaces, hence any internal stresses developed during the previous drying stage are allowed to dissipate. The moisture driven from the film 11 by the infrared heaters 23 and 24 is carried away by a stream of low humidity air that enters the second compartment 16 through air vents 18 and is removed through exhaust stack 27 by a blower not shown. The amount of drying accomplished in the second compartment 16 is regulated by adjusting the electric current supplied to the infrared heaters 23 and 24 and the flow of air through the compartment by adjusting damper 28.

On completing the drying, the film 11 is wound into "cast mill roll" 29 which is subsequently coated with an aqueous dispersion of vinylidene chloride by the aforementioned preferred procedure.

*Example I*

A web of wet gel regenerated cellulose film which had been prepared by the viscose process, purified by desulfurizing, bleaching and washing, then impregnated in a softener-resin bath containing propylene glycol and a melamine-formaldehyde anchor resin in sufficient concentration to leave 10 percent of propylene glycol and 0.4 percent of the resin on the film, based on the weight of the dry cellulose, was dried in accordance with the invention using a dryer similar to that shown in the attached drawing. The drying conditions were controlled so that the film contained 35% moisture as it left the first compartment equipped with steam heated dryer rolls and 3 percent moisture as it left the second dryer compartment equipped with infrared heaters. The dried cast film, which was collected in "mill roll" form, was 48 inches wide and had good flatness and excellent appearance.

A portion of the "cast mill roll" of film was coated with an aqueous dispersion of copolymers of vinylidene chloride, methyl acrylate and itaconic acid in the ratio of 94/6/1 which contained 37 percent by weight of solid copolymer and 18 percent glycerine to facilitate the smoothing of the coating prior to final drying to remove the moisture applied from the coating bath. The coating operation was performed on a coating apparatus similar to that illustrated in U.S. Patent 2,977,243 (Meier) equipped with a dip tank which contained the aqueous dispersion, a pair of doctor rolls for metering on the desired amount of coating bath and a bank of 10 smoothing rolls (5 on each side) to smooth the coating while it was still fluid. After drying, the film had 5 g./m.$^2$ of copolymer equally distributed on both surfaces. The coated film had good flatness, was free of wringles, puckers and folds and had excellent appearance, as there was no evidence of "edge blush" even on close examination. The width of the film was found to be unchanged during the coating process. This was quite surprising, since cast film produced in accordance with the old process usually shrinks 1 to 2 inches on being coated with an aqueous copolymer dispersion (film shrinkage during coating is frequently non-uniform and results in film having gauge bands and poor flatness).

*Example II*

Another portion of the "cast mill roll" described in Example I was coated with a nitrocellulose lacquer of the following composition using the immersion coating process disclosed in U.S. Patent 2,865,786 (Turik) which is the preferred procedure for applying lacquer coatings.

| | Parts by weight |
|---|---|
| Ethylene glycol ester of "Heet-Rex" acid [1] | 15 |
| Paraffin wax, M.P. 60° C. | 3 |
| Dibutyl phthalate | 15 |
| Dicyclohexyl phthalate | 15 |
| 11.6 percent N-nitrocellulose | 52 |
| Acetone | 467 |
| Toluene | 200 |

[1] See J. Ind. Eng. Chem. XXIX, 21.

After drying, the resulting film was 48 inches wide and had 2 grams/m.$^2$ of coating on each surface. This coated film had excellent flatness, heat seal strength, moistureproofness and transparency, being free of blush from bead to bead.

A control "mill roll" of cast film was prepared on the same casting machine and in a manner somewhat similar to that described in Example I above, except that all the drying was accomplished with only the steam heated dryer rolls. This was done by increasing the air flow through the first dryer compartment 15, increasing the steam flow through the dryer rolls 17 and stopping the flow of electric current to the infrared heaters in the second compartment 16 of the dryer. The resulting cast film was 49 inches in width, had good flatness and appearance and contained 3 percent moisture.

A portion of the control "cast mill roll" of film was coated with an aqueous vinylidene chloride copolymer identical to that described in Example 1 using similar coating procedures and conditions. The resulting coated film which was 47 inches wide was found to have the usual good physical properties; however, both edge lanes of the film were severely blushed for a distance of about 3 inches toward the center and the film also had poor flatness due, apparently, to a high degree of uneven shrinking which occurred during the coating step.

Another portion of the control "mill roll" of cast film was coated with a coating lacquer similar to that described in Example II. The resulting coated film was 47½ inches wide. Although the film had good physical properties, its appearance was substandard because of "edge blush" about two inches in toward the center of each bead. The intensity of the "edge blush," however, was not as pronounced as on the film coated with the aqueous copolymer dispersion. The difference in intensity of "edge blush" on the coated control samples is believed to be due to the difference in swelling of the base film by the two coating compositions.

Although the process of this invention is particularly suited for use in the preparation of regenerated cellulose films coated with vinylidene chloride copolymer dispersions, it should be clearly understood that the process is generally applicable to any hydrophilic base film such as polyvinyl alcohol, hydroxyethyl cellulose, hydroxypropyl cellulose, partially hydrolyzed ethylene-vinyl acetate copolymer, etc. with any coating composition which swells the base film. Typical coating compositions would include aqueous dispersions of such organic materials as cellulose derivatives; polyamides, polyesters, polyolefins, and copolymers of vinyl chloride and vinylidene chloride as well as solutions of these materials in acetone, ethyl alcohol, tetrahydrofurane or some similar polar organic liquid.

The critical drying process of this invention has been described with specific reference to the use of a dryer having a first compartment in which the drying of film is accomplished as it passes in a sinuous path over a series of dryer rolls and a second compartment in which drying is accomplished as the film passes suspended between infrared heaters. It should not be construed that the invention is limited to this particular drying apparatus, since any dryer equipped to accomplish primary drying while the film is held supported by a surface and secondary drying while the film is held suspended free from contact with a supporting surface can be used, providing the critical limits of drying are adhered to in each of the two drying steps. For example, film could be dried in accordance with this invention by passing it between two porous support belts through a first drying chamber where the heat is provided by infrared heaters, then through a free unsupported span where the film is exposed to jets of burning gas in close proximity to the film. The temperatures at which the drying takes place are those normally employed and known in the art. These temperatures are variable depending upon the type of film and the desired moisture content.

The accompanying drawing shows the film being dried in the second compartment 16 while being supported between two infrared heaters solely by guide rolls 21 and 22. In general, this particular arrangement is preferred, however, if the distance through the second dryer compartment is greater than about 6 ft., it may be desirable to provide one or more support rolls or spreader rolls within this drying compartment to prevent the film from folding at the edges. It may also be advantageous in certain instances to use several infrared heaters, equipped with either individual controls or a central control, which can be either manually or automatically adjusted.

Although examples are given in which a hydrophilic base film such as regenerated cellulose containing a softener, such as propylene glycol and an anchorage resin such as melamine-formaldehyde condensate product is treated in accordance with this invention, it should be pointed out that the usefulness of this process is not limited to base film impregnated with these materials. Base films used in carrying out this invention can contain any known softener which would include urea, calcium chloride, glycerine, ethylene glycol, propylene glycol, butylene glycol, diethylene glycol, triethylene glycol as well as a vast number of other hygroscopic organic and inorganic compounds and/or any known anchorage agents such as the urea-aldehyde resins, the melamine-aldehyde resins, the phenol-aldehyde resins, the polyalkylenimines and various modified forms of such materials or if desired the films can be completely free of these materials.

As has been stated, the preferred coating techniques for applying an aqueous copolymer dispersion is that described in U.S. Patent 2,977,243 (Meier) and for applying a coating lacquer solution as described in U.S. Patent 2,865,786 (Turik); however, the particular coating technique is not critical and any known technique can be used. The coating can be sprayed onto the film or applied by brushing or the like. The coating can be applied in a continuous or batch manner at either room temperature or at an elevated temperature.

"Edge blush" can be prevented by preparing coated film by the process of this invention, however, it is still not known what causes "edge blush" in the old process. It is believed that it is probably caused by non-uniform penetration of the coating bath into the base film, thus leading to areas of coating which coalesce improperly or perhaps in a different thickness, than adjacent area, thus causing a "lense effect" which would impair the transparency. Non-uniform penetration of coating bath into the base sheet might be caused by:

(1) Closely spaced submicroscopic scratches in the film caused by film slippage on the dryer rolls; or (2) Closely spaced minute areas of film which have shrunk improperly, or (3) A vast number of very small areas of film having moisture contents different from that of the main body of film.

Regardless of the exact cause of "edge blush," it is now apparent from the present invention that it originates during a critical drying stage when the film is in contact with a supporting surface.

The critical drying process of this invention has advantages over prior art processes in that it:

(1) Makes possible the production of coated film free of "edge blush" from a hydrophilic base film which is swelled by the coating composition, (2) Allows certain solvents to be used in preparing coating solutions that would not be satisfactory otherwise, (3) Allows a more even shrinkage and moisture distribution across the width of the cast film, (4) Has little, if any, loss in film width during the coating step, and (5) Results in a cast film which does not change its gauge profile during coating.

What is claimed is:

1. The process comprising drying a non-fibrous film of gel hydrophilic material to a moisture content within the range of 75 to 15 percent, based on the dry weight of the hydrophilic material, by contacting said film with a heated supporting surface, completing the drying of said film to a moisture content within the range of 1 to 10 percent by passing said film through at least one span in which said film is suspended out of contact with a heated surface, coating the dried film with a liquid coating composition containing an organic polymeric material and a liquid medium which swells the hydrophilic film and drying the coated film.

2. The process of claim 1 wherein the hydrophilic material is regenerated cellulose.

3. The process of claim 1 wherein the liquid coating composition is an aqueous dispersion of vinylidene chloride copolymer.

4. The process of claim 3 wherein the aqueous dispersion of vinylidene chloride copolymer additionally contains a polyhydric alcohol.

5. In a process for preparing a polymer coated non-fibrous hydrophilic film wherein a wet gel non-fibrous hydrophilic film is impregnated with a softener and an anchorage agent, dried, coated with a liquid coating composition containing an organic polymeric material and a liquid medium which swells said film and the coated film dried, the improvement in said first drying step which comprises drying the impregnated gel film to a moisture content within the range of 75 to 15 percent, based on the dry weight of the hydrophilic material, by passing said film over a series of heated rolls and completing the drying of said film to a moisture content within the range of 1 to 10 percent by passing said film through at least one span in which said film is suspended out of contact with a heated surface.

6. The process of claim 5 wherein the hydrophilic material is regenerated cellulose.

7. The process of claim 6 wherein the gel regenerated cellulose film is first dried to a moisture content of about 35 percent and finally dried to a moisture content of about 3 percent.

References Cited in the file of this patent

UNITED STATES PATENTS

| | | |
|---|---|---|
| 1,978,341 | Coleman | Oct. 23, 1934 |
| 2,098,534 | Charch et al. | Nov. 9, 1937 |
| 2,201,747 | Staudt | May 21, 1940 |
| 2,281,496 | Hanson | Apr. 28, 1942 |
| 2,321,938 | Quinn | June 15, 1943 |
| 2,593,207 | Silver | Apr. 15, 1952 |
| 2,597,625 | Drisch et al. | May 20, 1952 |
| 2,971,857 | Baxter | Feb. 14, 1961 |
| 2,977,243 | Meier | Mar. 28, 1961 |